Nov. 30, 1937.    A. L. PORTER    2,100,917
BICYCLE LOCK
Filed Feb. 29, 1936
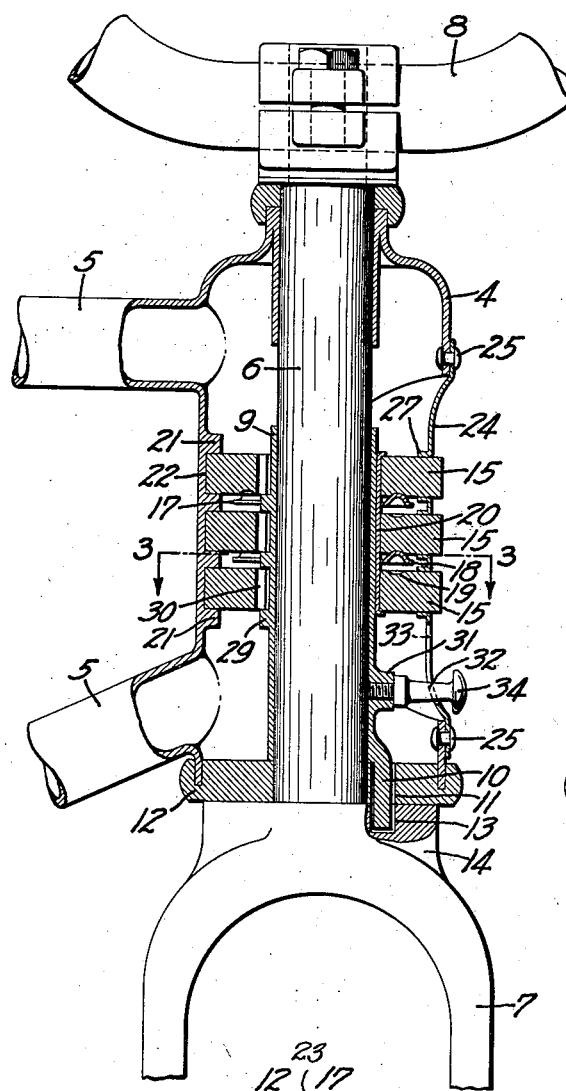
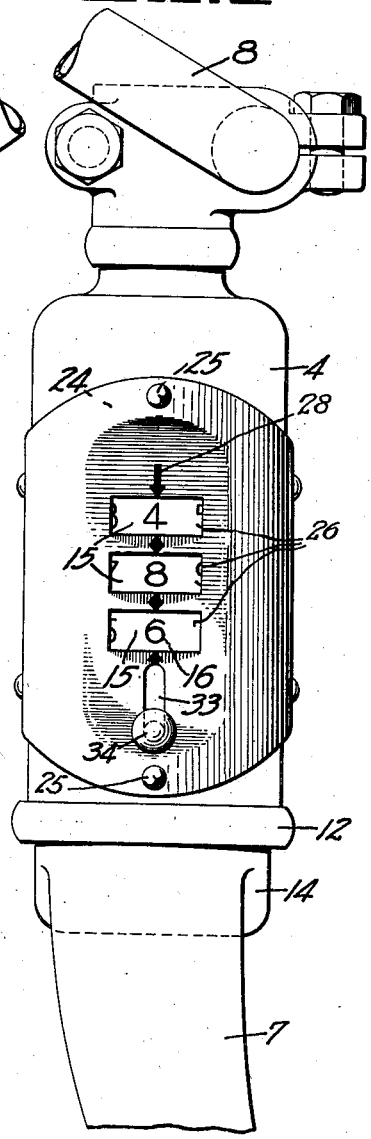
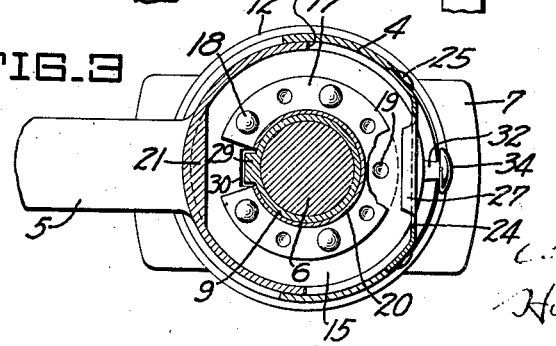
INVENTOR
Alvan Leigh Porter
BY Harry C. Schroeder
ATTORNEY Patented Nov. 30, 1937

2,100,917

UNITED STATES PATENT OFFICE 2,100,917

BICYCLE LOCK

Amyas Leigh Porter, Oakland, Calif.

Application February 29, 1936, Serial No. 66,473

6 Claims. (Cl. 70—185)

This invention relates to means for locking an operating member of a bicycle, or the like, in abnormal position so as to prevent unauthorized use of the vehicle.

It is an object of the invention to provide a lock mechanism which is substantially totally enclosed within the bicycle frame so that the possibility of the lock being forcibly released by unauthorized persons is practically eliminated. Another object of the invention is to provide a combination lock, for the use described, having relatively few moving parts, and one in which such parts are ruggedly constructed and are not liable to get out of order or be easily tampered with.

The broader aspects of the invention may be ascertained by reference to the accompanying drawing in which:

Figure 1 is a side elevational view, partly in vertical section, of a portion of the frame structure of a bicycle, centered around the steering spindle, with which the lock of my invention is incorporated.

Figure 2 is a front elevational view of the structure shown in Figure 1.

Figure 3 is a horizontal sectional view taken in the plane indicated by the line 3—3 of Figure 1.

In detail, the lock of my invention is positioned within the cylindrical housing 4, which is located at the front end of the bicycle frame 5 and encloses the steering spindle 6 carrying the fork 7 and the handle-bars 8, and comprises a tubular bolt 9, slidably mounted axially of the spindle, provided at its lower end with a lug 10 which passes slidably through an aperture 11 formed in the end plate 12 of the housing and into a depression 13 formed in the face of the fork hub 14. The depression 13 is so located that, when the lug 10 is engaged therein, the fork 7, and consequently the front wheel, not shown, will be locked against movement at right angles to the normal positions thereof when the vehicle is being ridden, thereby preventing the vehicle being steered, and consequently ridden, by unauthorized persons.

Means are provided for locking the bolt 9 either in raised or lowered positions so as to respectively permit or prevent operation of the vehicle. Journaled about the bolt 9 is a plurality, preferably three, of disks 15, each being provided, on its periphery, with spaced consecutive numerals 16 from zero to nine. The disks are spaced apart axially and in each space is positioned a latch element comprising an arcuate strip 17, of thin spring metal, having protuberances 18 stamped therein; alternate protuberances, as is shown in Figure 3, projecting from opposite faces of the strip. Each disk, on the surface thereof facing a latch element, is provided with depressions 19 in which the protuberances 18 seat. To provide for holding all of the disks and the latch elements together in a unitary assembly, a sleeve 20 is passed through the bores of the disks and elements and is headed at each end so as to prevent separation of the disks.

The housing 4 is provided, on the inside surface of the rear wall thereof, with a plurality of spaced lugs 21 which provide notches 22 engaging the disks 15 for fixedly positioning them axially of the housing, and the front wall of the housing is provided with a large elongated aperture 23 through which the disks project. A cover plate 24, secured to the housing by rivets 25, overlies the aperture and is itself provided with apertures 26 having marginal flanges 27 which provide bearings for the disks similar to that provided by the lugs 21. The cover plate is provided with pointers 28 with which the numerals on the disks may be registered when the latter are rotated.

The bolt 9 is provided, as is shown in Figures 1 and 3, with three keys 29, equal in width to slightly less than the width of the space between the disks, and in spacing to that of the disks, and each disk is provided with a notch 30 into which the keys are slidably engageable. The notches may of course be positioned opposite any of the several numbers on each disk so as to provide different combinations for the lock.

Means are provided by means of which the bolt 9 may be manually moved axially of the spindle 6 so as to engage and disengage the lug 10 and thereby lock or unlock the fork 7. Formed adjacent the lower end of the bolt is a boss 31 tapped to receive the threaded shank of a stud 32 which projects outwardly through an elongated aperture, 33 formed in the cover plate 24 and is provided with a head 34 to provide a finger grip. When the notches 30 of the disks are in alinement the bolt may, by raising and lowering the stud 32, be shifted axially of the spindle. To provide clearance for the keys 29, as they move into and out of engagement with the notches 30, the sleeve 20 and the latch elements 17 are both cut away as is clearly shown in Figure 3.

As was stated above, the main feature of the invention lies in the fact that the lock is enclosed within the spindle housing. I am aware that combination locks have been used before in connection with the steering mechanism of vehicles to render the latter inoperative by unauthorized persons. Most of these devices have been, however, mounted either wholly, or for the most part, on an exterior portion of the mechanism where they are exposed to probable damage or from where they may be dislodged, by persons desirous of stealing the vehicle, by the use of force such as blows from a hammer or by use of a pinch bar. The lock of my invention is designed to foil such attempts at stealing the vehicle by the exposure of none of the portions of the lock which may be tampered with so as to force release thereof.

I claim:

1. The combination, with the steering spindle, which carries the front wheel fork of a bicycle, and the housing in which said spindle is journaled, of a sleeve-like bolt enclosing said spindle and movable axially thereon, a lug projecting from one end of said sleeve-like bolt for engaging said housing and said fork to prevent relative movement therebetween and means for selectively locking said sleeve-like bolt with the lug in or out of engagement with said fork.

2. The combination, with the steering spindle, which carries the front wheel fork of a bicycle, and the housing in which said spindle is journaled, of a sleeve-like bolt enclosing said spindle and movable axially thereon, a lug projecting from one end of said sleeve-like bolt for engaging said housing and said fork to prevent relative movement therebetween and means for selectively locking said sleeve-like bolt with the lug in or out of engagement with said fork, said means comprising a plurality of disks rotatably mounted on said bolt, each of said disks having a notch in its inside periphery and extending axially of said bolt, and keys associated with said disks carried by the periphery of the sleeve-like bolt and movable therewith upon movement of said bolt axially of said spindle, through said notches to positions engaging opposite sides of said disks when the latter are rotated.

3. The combination, with the steering spindle, which carries the front wheel fork of a bicycle, and the housing in which said spindle is journaled, of a sleeve-like bolt enclosing said spindle and movable axially thereon, a lug projected from one end of said sleeve-like bolt for engaging said housing and said fork to prevent relative movement therebetween, means for selectively locking said sleeve-like bolt with the lug in or out of engagement with said fork, said means comprising a plurality of disks rotatably mounted on said bolt, said disks each having a notch in its inner periphery and extending axially of said bolt, and keys associated with said disks carried by the periphery of said sleeve-like bolt and slidable, upon movement of said bolt axially of said spindle, through said notches to positions engaging opposite sides of said disks when the latter are rotated and resilient means for resisting relative rotation between said disks.

4. The combination, with the steering spindle, which carries the front wheel fork of a bicycle, and the housing in which said spindle is journaled, of a tubular bolt mounted concentrically with said spindle and movable axially thereof, a lug at one end of said bolt for engaging said housing and said fork to prevent relative movement therebetween, a plurality of disks rotatably mounted on said bolt, said disks each having a notch therein extending axially of said bolt, keys associated with said disks mounted on said bolt and slidable, upon movement of said bolt axially of said spindle, through said notches to positions engaging opposite sides of said disks when the latter are rotated, a cover plate on said housing having apertures therein through which portions of said disks are exposed to permit manual movement thereof, and means extending from said bolt through said cover plate to permit manual movement of said bolt.

5. The combination, with the steering spindle, which carries the front wheel fork of a bicycle, and the housing in which said spindle is journaled, of a tubular bolt mounted concentrically with said spindle and movable axially thereof, a lug at one end of said bolt for engaging said housing and said fork to prevent relative movement therebetween, a plurality of disks rotatably mounted on said bolt, said disks each having a notch therein extending axially of said bolt, keys associated with said disks mounted on said bolt and slidable, upon movement of said bolt axially of said spindle, through said notches to positions engaging opposite sides of said disks when the latter are rotated, a cover plate on said housing having apertures therein through which portions of said disks are exposed to permit manual movement thereof, and a slot therein adjacent said disk apertures, and a stud mounted on said bolt and projecting through said slot.

6. The combination, with the steering spindle, which carries the front wheel fork of a bicycle, and the housing in which said spindle is journaled, of a tubular bolt mounted concentrically with said spindle and movable axially thereof, a lug at one end of said bolt for engaging said housing and said fork to prevent relative movement therebetween, a sleeve mounted concentrically with said bolt, said sleeve having flanges formed at each end thereof, a plurality of disks rotatably mounted on said sleeve, between said flanges and spaced axially therealong, said disks each having a notch therein extending axially of said bolt, an annular member of resilient material disposed between each pair of said disks, said member having oppositely directed protuberances formed thereon engaging adjacent faces of said disks, keys associated with said disks formed on said bolt and slidable, upon movement of said bolt axially of said spindle, through said notches to positions engaging opposite sides of said disks when the latter are rotated, a cover plate on said housing having apertures therein through which portions of said disks are exposed to permit manual movement thereof and a slot therein adjacent said disk apertures, and a stud mounted on said bolt and projecting through said slot.

AMYAS LEIGH PORTER.